United States Patent
Jang et al.

(10) Patent No.: US 9,104,266 B2
(45) Date of Patent: Aug. 11, 2015

(54) SIGNAL PROCESSING CIRCUIT AND SIGNAL PROCESSING SYSTEM OF TOUCH SCREEN

(71) Applicant: SILICON WORKS CO., LTD., Daejeon-si (KR)

(72) Inventors: Yeong Shin Jang, Daejeon-si (KR); Jung Min Choi, Daejeon-si (KR); Yong Suk Kim, Daegu-si (KR); Hyung Seog Oh, Daejeon-si (KR)

(73) Assignee: SILICON WORKS CO., LTD., Daejeon-Si (KR)

( * ) Notice: Subject to any disclaimer, the term of this patent is extended or adjusted under 35 U.S.C. 154(b) by 107 days.

(21) Appl. No.: 13/888,698

(22) Filed: May 7, 2013

(65) Prior Publication Data
US 2013/0300692 A1 Nov. 14, 2013

(30) Foreign Application Priority Data
May 9, 2012 (KR) .................. 10-2012-0049159

(51) Int. Cl.
*G06F 3/043* (2006.01)
*G06F 3/041* (2006.01)
*G06F 3/044* (2006.01)

(52) U.S. Cl.
CPC .............. *G06F 3/0418* (2013.01); *G06F 3/044* (2013.01); *G06F 2203/04107* (2013.01)

(58) Field of Classification Search
CPC ....... G06F 3/041; G06F 3/044; G06F 3/0418; G06F 2203/04107
USPC .................. 345/173–179, 204–215; 178/18.01–18.09, 20.01–20.04
See application file for complete search history.

(56) References Cited

U.S. PATENT DOCUMENTS

| | | | |
|---|---|---|---|
| 8,654,098 B2 * | 2/2014 | Ningrat | 345/174 |
| 8,866,493 B2 * | 10/2014 | Kremin et al. | 324/613 |
| 2010/0117986 A1 | 5/2010 | Yang | |
| 2012/0049869 A1 * | 3/2012 | Kremin et al. | 324/679 |
| 2013/0063388 A1 * | 3/2013 | Ningrat | 345/174 |

FOREIGN PATENT DOCUMENTS

| KR | 10-2012-0027412 | 3/2012 |
|---|---|---|
| KR | 10-2012-0040037 | 4/2012 |

* cited by examiner

*Primary Examiner* — Vijay Shankar
(74) *Attorney, Agent, or Firm* — Kile Park Reed & Houtteman PLLC

(57) ABSTRACT

The present invention discloses a signal processing circuit and a signal processing system for processing an input signal provided from a touch screen in response to a driving signal.

20 Claims, 10 Drawing Sheets

SIGNAL PROCESSING CIRCUIT AND SIGNAL PROCESSING SYSTEM OF TOUCH SCREEN

BACKGROUND OF THE INVENTION

1. Field of the Invention

The present invention relates to a touch screen, and more particularly, to a signal processing circuit for processing an input signal provided from a touch screen in response to a driving signal and a signal processing system.

2. Description of the Related Art

A touch screen uses a driving signal to determine whether a user's touch occurs or not. A driving signal may be applied to the touch screen, the applied driving signal may be outputted through the touch screen, and whether or not a user touched the touch screen may be determined through change in the signal outputted from the touch screen.

The driving signal of the touch screen may be influenced by various noises. The noises which may influence the driving signal of the touch screen may include noise caused by a power supply voltage of a display panel, noise caused by an external lighting, noise caused by a user's finger and the like.

Such noises may be introduced into the touch screen, and the touch screen may output a signal containing noise.

When a signal containing noise is outputted from the touch screen, it becomes difficult to accurately determine changes of the signal. As a result, the noise makes it difficult to determine whether or not a user touched the touch screen.

SUMMARY OF THE INVENTION

Accordingly, the present invention has been made in an effort to solve the problems occurring in the related art, and an object of the present invention is to provide a signal processing circuit capable of improving a signal-to-noise ratio (SNR) by filtering noise contained in an input signal provided from a touch screen.

Another object of the present invention is to provide a signal processing circuit capable of filtering continuous noise contained in an input signal provided from a touch screen.

Another object of the present invention is to provide a signal processing circuit capable of detecting peaking noise from an input signal provided from a touch screen and controlling transmission of the input signal containing peaking noise to the next stage when the peaking noise is detected.

Another object of the present invention is to provide a signal processing circuit capable of band-pass-filtering continuous noise contained in an input signal provided from a touch screen and preventing peaking noise from being transmitted when peaking noise is detected from the input signal.

Another object of the present invention is to provide a signal processing circuit capable of filtering continuous noise from a path for transmitting an input signal provided from a touch screen, detecting peaking noise of the input signal in a separate path, and controlling transmission of the input signal when the peaking noise is detected.

In order to achieve the above object, according to one aspect of the present invention, there is provided a signal processing circuit of a touch screen, including: a differential circuit configured to generate a differential signal by differentiating an input signal provided from a coupling capacitor of the touch screen in response to a driving signal; a first integral circuit configured to generate a first integral signal by integrating the differential signal according to an integral control signal; and a noise sensing circuit configured to generate and provide the integral control signal which is activated when the input signal contains peaking noise.

According to another aspect of the present invention, there is provided a signal processing system of a touch screen, including: a first switch block configured to switch a plurality of channels set in the touch screen in response to a channel select signal; a touch signal processing block including a plurality of touch signal processing circuits configured to generate a plurality of noise detection signals by processing input signals for the respective channels, and generating a plurality of integral signals by processing the input signals for the respective channels; a second switch block configured to switch transmission of the plurality of integral signals to an analog digital converter in response to a multiplexer control signal; and a control signal generation block configured to generate the plurality of control signals using the plurality of noise detection signals and generate the channel select signal and the multiplexer control signal.

According to another aspect of the present invention, there is provided a touch signal processing circuit including: a first circuit configured to provide a noise detection path for receiving an input signal transmitted from a touch screen and generating a noise detection signal indicating whether or not the input signal contains peaking noise; and a second circuit configured to provide a main signal path for receiving the input signal, generating an integral signal by band-pass-filtering continuous noise contained in the input signal, and control transmission of the integral signal through the main signal path in response to the noise detection signal.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
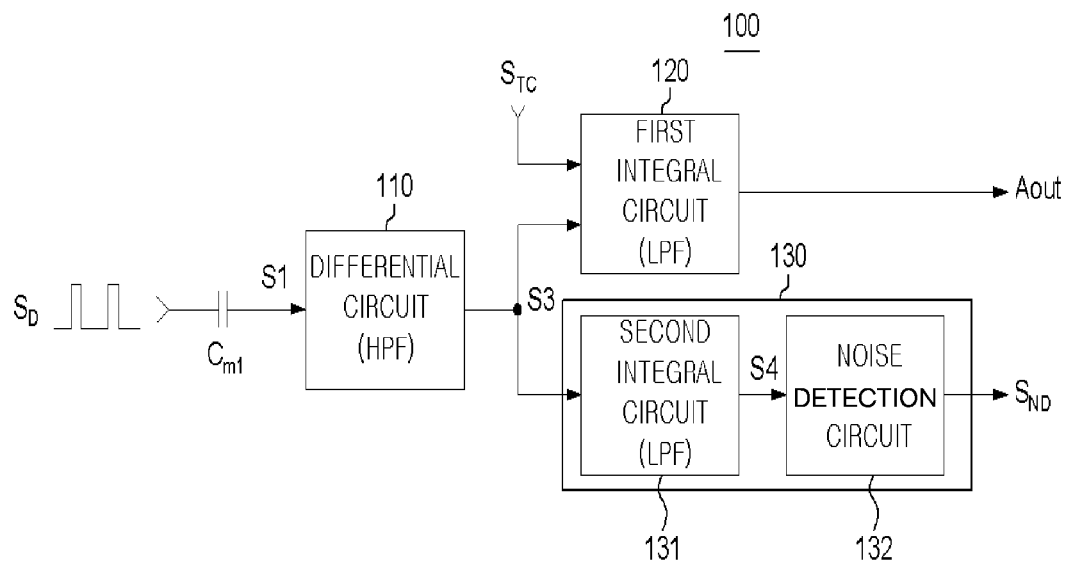
FIG. 1 illustrates a signal processing circuit of a touch screen according to an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a signal processing circuit of a touch screen according to an embodiment of the present invention.

Referring to FIG. 1, the signal processing circuit 100 includes a differential circuit 110, a first integral circuit 120, and a noise sensing circuit 130.

The differential circuit 110 is coupled to a coupling capacitor $C_{m1}$ and generates a differential signal S3 by differentiating an input signal S1 applied from the coupling capacitor $C_{m1}$.

The coupling capacitor $C_{m1}$ is formed at an intersection node between a driving electrode and a receiving electrode of the touch screen, and has capacitance which is changed depending on whether or not a user touches the touch screen. That is, the input signal S1 has information on whether or not a user touches the touch screen.

The driving electrode of the touch screen is configured to receive a driving signal $S_D$, and the receiving electrode of the touch screen is connected to the differential circuit 110. The driving signal $S_D$ may be a square wave signal having a predetermined frequency. The differential signal S3 outputted from the differential circuit 110 includes a falling differential output signal and a rising differential output signal, which occur at rising and falling timings of the driving signals $S_D$. The falling and rising differential output signals are peak signals which have the same magnitude and opposite polarities.

The first integral circuit 120 operates in response to an integral control signal $S_{TC}$, and is configured to remove continuous noise by integrating the differential signal S3 or prevent peaking noise from being transmitted to the next stage without integrating the differentil signal S3.

The continuous noise has a lower frequency band or higher frequency band than the frequency of the driving signal $S_D$. For example, the continuous noise may include 60 Hz noise occurring in a fluorescent lamp, three-wavelength noise occurring in a three-wavelength inverter lamp and the like.

On the other hand, the peaking noise includes noises having a peak component, such as display noise occurring when driving a display, charger noise occurring during battery charging and the like. The integral control signal $S_{TC}$ contains information on whether or not peaking noise is contained in the input signal S1.

The noise sensing circuit 130 includes a second integral circuit 131 and a noise detection circuit 132. The noise sensing circuit 130 integrates the differential signal S3 in the second integral circuit 131, and generates a noise detection signal $S_{ND}$ indicating whether or not the input signal S1 contains peaking noise, using the integral signal S4 of the second integral circuit 131 in the noise detection circuit 132. The noise detection signal $S_{ND}$ may be used for generating the integral control signal $S_{TC}$. The noise sensing circuit 130 may further include an integral control signal generation circuit, which will be described below with reference to FIG. 8, in order to provide the integral control signal $S_{TC}$ to the first integral circuit 120.

The signal processing circuit of the touch screen according to the embodiment of the present invention includes a main signal path and a noise detection path in terms of processing the input signal S1. The main signal path includes the differential circuit 110 and the first integral circuit 120, and band-pass-filters and removes continuous noise contained in the input signal S1. The noise detection path includes the differential circuit 110, the second integral circuit 131, and the noise detection circuit 132, and generates a signal used for controlling the operation of the main signal path (for example, an integral control signal) when detecting that peaking noise is contained in the input signal S1, thereby controlling the input signal S1 to not be transmitted to the next stage. Therefore, the signal processing circuit of the touch screen according to the embodiment of the present invention may filter the continuous noise and the peaking noise which are contained in the input signal S1.

FIG. 1 illustrates a case in which the signal processing circuit processes a driving signal $S_D$ of one channel. Hereafter, a mode in which the signal processing circuit processes a driving signal $S_D$ of one channel is referred to as a single mode.

Figure 2:
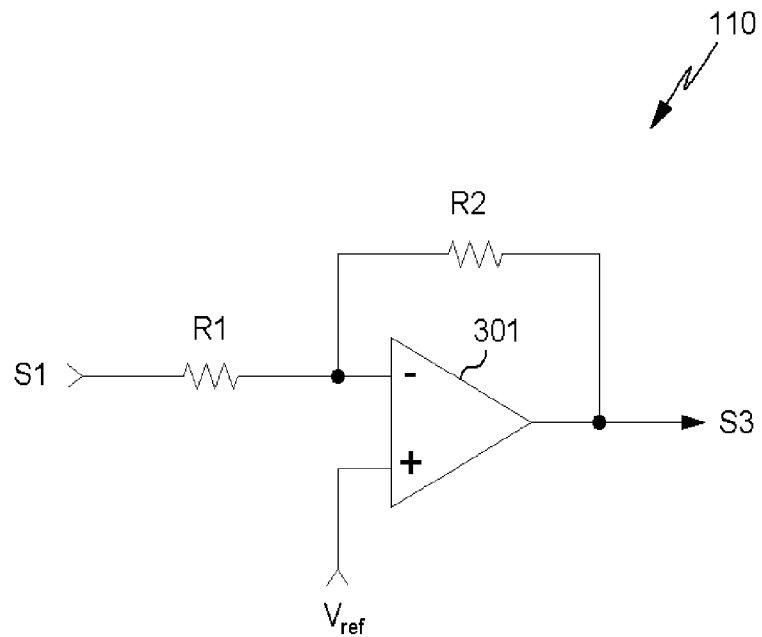
FIG. 2 illustrates a differential circuit of FIG. 1.

FIG. 2 illustrates the differentiator of FIG. 1.

Referring to FIG. 2, the differential circuit 110 includes an operational amplifier 301, a resistor R1, and a resistor R2. The operational amplifier 301 is configured to output the differential signal S3 in response to the input signal S1 provided from the receiving electrode of the touch screen. The resistor R1 is connected between one end of the coupling capacitor $C_{m1}$ forming the receiving electrode and a negative input terminal (−) of the operational amplifier 301. The resistor R2 is connected between the negative input terminal (−) and an output terminal of the operational amplifier 301. A positive input terminal (+) of the operational amplifier 301 receives a reference voltage Vref.

The differential circuit 110 may be coupled to the coupling capacitor $C_{m1}$ and operates as a circuit to differentiate the input signal S1. The differential circuit 110 may have the characteristic of a high pass filter (HPF) in terms of frequency, using parasitic capacitance and parasitic resistance of the touch screen. The HPF function of the differential circuit 110 using the coupling capacitor $C_{m1}$, the resistor R1, and the parasitic capacitance and parasitic resistance of the touch screen will be described in detail with reference to FIG. 12.

Figure 3:
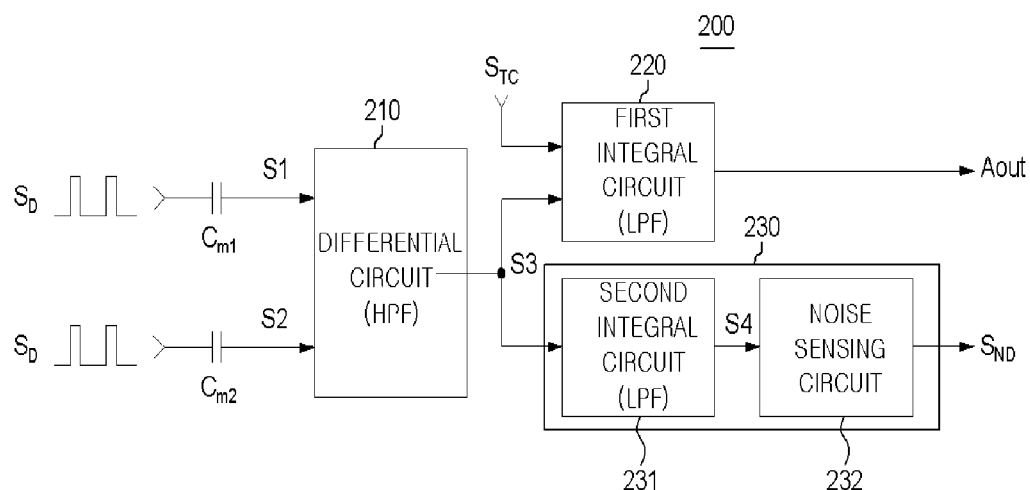
FIG. 3 illustrates a signal processing circuit of a touch screen according to another embodiment of the present invention.

FIG. 3 illustrates a signal processing circuit 200 of a touch screen according to another embodiment of the present invention.

Referring to FIG. 3, a differential circuit 210 is coupled to coupling capacitors $C_{m1}$ and $C_{m2}$ of two adjacent channels. The differential circuit 210 generates a differential signal S3 by differentiating a difference between input signals S1 and S2 applied through the coupling capacitors $C_{m1}$ and $C_{m2}$. Since a first integral circuit 220 and a noise detection circuit 230 are configured in the same manner as those illustrated in FIG. 1, the detailed descriptions thereof are omitted herein.

The signal processing circuit 200 of FIG. 3 processes driving signals $S_D$ of two adjacent channels. Hereafter, a mode in which the signal processing circuit 200 processes driving signals $S_D$ of two channels is referred to as a differential mode.

Figure 4:
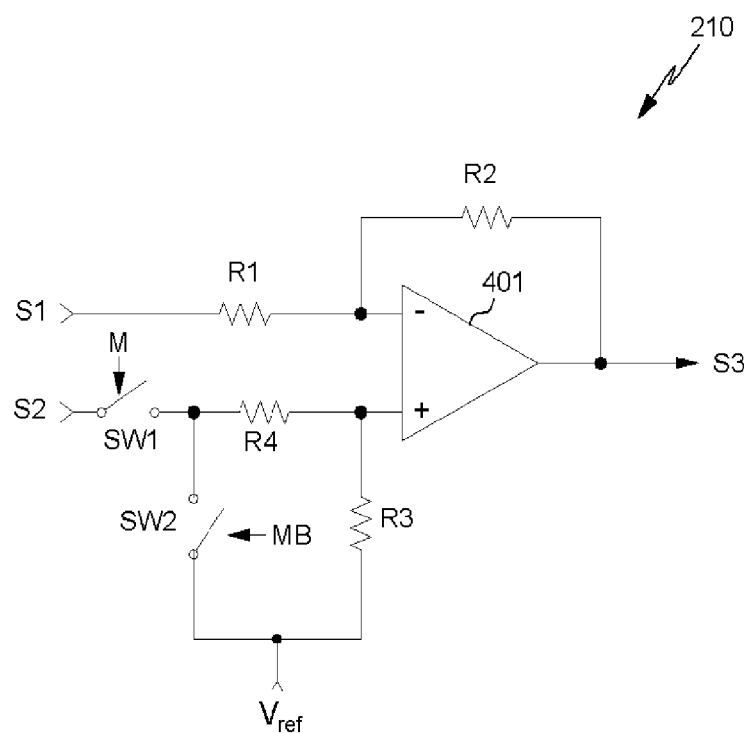
FIG. 4 illustrates a differential of FIG. 3.

FIG. 4 illustrates the differential circuit of FIG. 3.

Referring to FIG. 4, the differential circuit 210 includes an operational amplifier 401, a resistor R1, a resistor R2, a resistor R3, a resistor R4, a switch SW1, and a switch SW2.

The operational amplifier 401 generates a differential signal S3 by differentiating a difference between the input signals S1 and S2 applied through the coupling capacitors $C_{m1}$ and $C_{m2}$, respectively.

The resistor R1 is connected between the coupling capacitor $C_{m1}$ and a negative input terminal (−) of the operational amplifier 401. The resistor R2 is connected between the negative input terminal (−) and an output terminal of the operational amplifier 401. A positive input terminal (+) of the operational amplifier 401 is connected in parallel to the resistors R3 and R4, a reference voltage Vref is applied to the resistor R3, and the resistor R4 are connected in parallel to the switches SW1 and SW2. The switch SW1 switches transmission of the input signal S2 to the positive input terminal (+) of the operational amplifier 401 through the resistor R4 in response to a differential mode signal M indicating the differential mode operation. And the switch SW2 switches transmission of the reference voltage Vref to a node between the switch SW1 and the resistor R4 in response to a single mode signal MB. The single mode signal MB is a signal indicating the single mode operation, and has the same magnitude as the differential mode signal M and the opposite phase to the differential mode signal M.

The operation mode of the differential circuit 210 may be selected by activation of the single mode signal MB or the differential mode signal M.

In the single mode, the switch SW1 is turned off, the switch SW2 is turned on, and the differential circuit 210 performs a differentiation operation on the input signal S1, like the differential circuit 210 of FIG. 2.

In the differential mode, the switch SW1 is turned on, the switch SW2 is turned off, and the differential circuit 210 performs a differentiation operation on a difference between the input signals S1 and S2. The resistors R1 and R2 of FIG. 2 or the resistors R1 to R4 of FIG. 4 may be variable resistors. The differential circuit 110 or 210 of FIG. 2 or 4 may control a gain and a frequency characteristic by adjusting the resistance value of the resistors R1 and R2 or the resistors R3 and R4.

Figure 5:
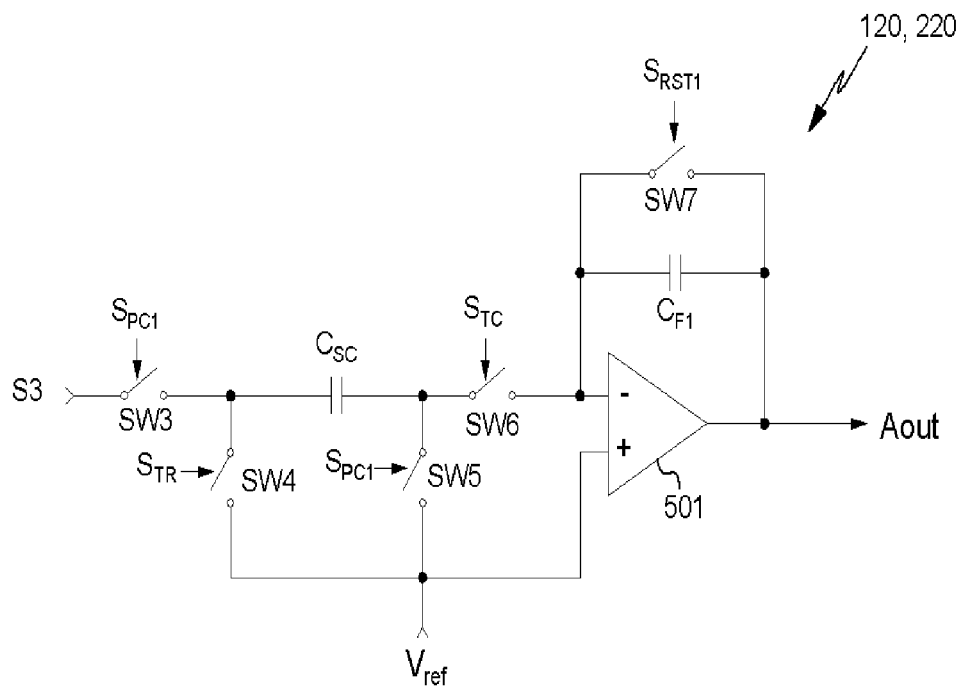
FIG. 5 illustrates a first integral circuit according to the embodiment of the present invention.

FIG. 5 illustrates the first integral circuit 120 or 220 according to the embodiment of the present invention. The first integral circuit 120 or 220 illustrated in FIG. 5 performs a function as a finite impulse response filter having a switching frequency which corresponds to the frequency of the driving signal $S_D$.

Referring to FIG. 5, the first integral circuit 120 or 220 includes an operational amplifier 501, a switched capacitor $C_{SC}$, a switch SW3, a switch SW4, a switch SW5, a switch SW6, a switch SW7, and a feedback capacitor $C_{F1}$. The switched capacitor $C_{SC}$ and the feedback capacitor $C_{F1}$ may be a variable capacitor capable of controlling the gain and frequency characteristic of the first integral circuit 120 or 220.

The operational amplifier 501 receives the reference voltage $V_{ref}$ through a positive input terminal (+) thereof, and a negative input terminal (−) thereof is connected to the switch SW6. Furthermore, the capacitor $C_{F1}$ and the switch SW7 are connected in parallel between the negative input terminal (−) and an output terminal of the operational amplifier 501. The operational amplifier 501 integrates the differential signal S3 and generates a first integral signal Aout.

The switched capacitor $C_{SC}$ is connected between the switch SW3 switching transmission of the differential signal S3 and the switch SW6 connected to the negative input terminal (−) of the operational amplifier 501. A node connected between the switched capacitor $C_{SC}$ and the switch SW3 is connected to the switch SW4 switching the reference voltage $V_{ref}$, and a node connected between the switched capacitor $C_{SC}$ and the switch SW6 is connected to the switch SW5 switching the reference voltage $V_{ref}$.

The switched capacitor $S_{SC}$ and the feedback capacitor $C_{F1}$ may be configured to have variable capacitance. The switched capacitor $C_{SC}$ has a resistance characteristic which is set according to capacitance and switching frequencies of the switches SW3 to SW6. The first integral circuit 120 or 220 operates as an integrator to integrate the differential signal S3 using the operational amplifier 501, the switched capacitor $C_{SC}$, and the feedback capacitor $C_{F1}$.

The switch SW3 switches transmission of the differential signal S3 to the switched capacitor $C_{SC}$ in response to a first precharge signal $S_{PC1}$. The switch SW4 switches application of the reference voltage $V_{ref}$ to one end of the switched capacitor $C_{SC}$ in response to a charge transfer signal $S_{TR}$. The switch SW5 switches application of the reference voltage $V_{ref}$ to the other end of the switched capacitor $C_{SC}$ in response to the first precharge signal $S_{PC1}$. The switch SW6 switches connection of the switched capacitor $C_{SC}$ to the negative input terminal (−) of the operational amplifier 501 in response to the integral control signal $S_{TC}$. The switch SW7 resets the feedback capacitor $C_{F1}$ in response to a first reset signal $S_{RST1}$.

As the first precharge signal $S_{PC1}$ and the charge transfer signal $S_{TR}$, non-overlap two phase signals of which activation sections do not overlap each other may be used to prevent charge leakage from occurring due to switches which are shorted at the same time.

The first integral circuit 120 or 220 samples one of a falling differential output signal and a rising differential output signal, and integrates the sampled signal N times where N is a natural number equal to or more than 1. According to above-mentioned integration of the first integral circuit 120 or 220, the first integral circuit 120 or 220 shifts frequencies of the differential signal around the frequency $f_{driving}$ of the driving signal $S_D$ in a frequency domain into a low-frequency band, and generates a null frequency. When the integration number N is adjusted, the null frequency may be controlled, and expected noise may be removed. For example, when noise is expected to occur at a frequency of 50 KHz, the integration number N may be adjusted so that the first integral circuit 120 or 220 generates a null frequency of 50 kHz, thereby removing 50 kHz noise.

The integral control signal $S_{TC}$ is a signal for determining whether or not to transfer charges stored in the switched capacitor $C_{SC}$ to the negative input terminal (−) of the operation amplifier 501, and related to the charge transfer signal $S_{TR}$. When the integral control signal $S_{TC}$ turns on the switch SW6, charges stored in the switched capacitor $C_{SC}$ are transmitted to the operational amplifier 501 in response to the charge transfer signal $S_{TR}$, and the first integral circuit 120 or 220 integrates the differential signal S3. However, when the integral control signal $S_{TC}$ turns off the switch SW6, the charges stored in the switched capacitor $C_{SC}$ are blocked from being transmitted to the operational amplifier 501 regardless of the charge transfer signal $S_{TR}$.

Figure 6:
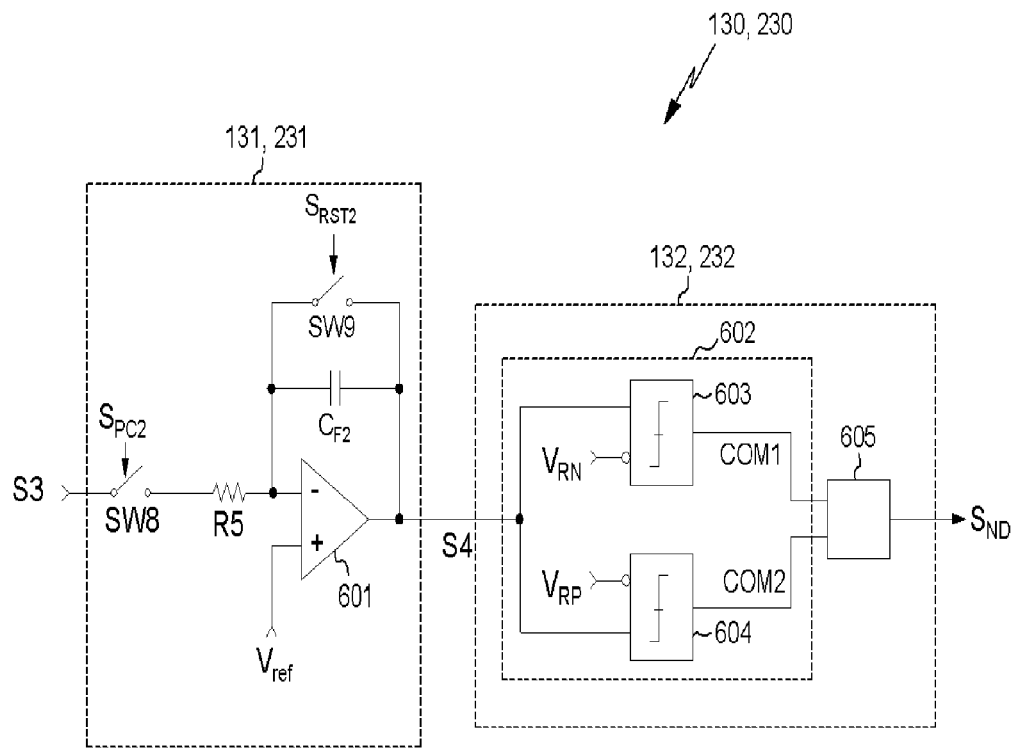
FIG. 6 illustrates a noise sensing circuit according to the embodiment of the present invention.

FIG. 6 illustrates the noise sensing circuit according to the embodiment of the present invention.

Referring to FIG. 6, the noise sensing circuit 130 or 230 includes the second integral circuit 131 or 231 and the noise detection circuit 132 or 232.

The second integral circuit 131 or 231 includes an operational amplifier 601, a resistor R5, a switch SW8, a switch SW9, and a feedback capacitor $C_{F2}$. The operational amplifier 601 is configured to receive the reference voltage $V_{ref}$ through a positive input terminal (+) thereof, and the resistor R5 is connected to a negative input terminal (−) of the operational amplifier 601. The switch SW9 and the feedback capacitor $C_{F2}$ are connected in parallel between the negative input terminal (−) and an output terminal of the operational amplifier 601. The switch SW8 switches transmission of the differential signal S3 to the resistor R5 in response to a second precharge signal $S_{PC2}$. The switch SW9 resets the feedback capacitor $C_{F2}$ in response to the second reset signal $S_{RST2}$. In this embodiment of the present invention, the second integral circuit 131 or 231 is implemented with an RC integrator. However, the second integral circuit 131 or 231 is not limited thereto, and may be implemented with a switched capacitor integrator, for example.

In the second integral circuit 131 or 231, the resistor R5 may be configured with a variable resistor, and the feedback capacitor $C_{F2}$ may be configured to have variable capacitance.

The second integral circuit 131 or 231 integrates both of the falling differential output signal and the rising differential output signal and generates a second integral signal S4. The falling differential output signal and the rising differential output signal have the same magnitude and opposite polarities. Thus, when the input signal S1 contains no peaking noise, the second integral signal S4 becomes the level of the reference voltage $V_{ref}$ regardless of whether a touch occurred or not. On the other hand, when the input signal S1 contains peaking noise, the second integral signal S4 has a larger or smaller level than the level of the reference voltage $V_{ref}$.

The noise detection circuit 132 or 232 checks whether or not the second integral signal S4 corresponds to the level of the reference voltage $V_{ref}$, and determines whether or not the input signal S1 contains peaking noise. Since the second integral signal S4 may be smaller or larger than the level of the reference voltage $V_{ref}$ due to peaking noise, a first comparison voltage $V_{RN}$ smaller than the reference voltage $V_{ref}$ and second comparison voltages $V_{RN}$ and $V_{RP}$ larger than the reference voltage $V_{ref}$ may be used as reference signals for determining whether or not the input signal contains peaking noise.

The noise detection circuit 132 or 232 includes a comparison unit 602 and an operation circuit 605. The comparison unit 602 may include a comparator 603 and a comparator 604. The comparator 603 is configured to compare the second integral signal S4 and the first comparison voltage $V_{RN}$ and generate a first comparison signal COM1, and the comparator 604 is configured to compare the second integral signal S4 and the second comparison voltage $V_{RP}$ and generate a second comparison signal COM2. The first and second comparison voltages $V_{RN}$ and $V_{RP}$ may be set according to the magnitude of peaking noise which is to be detected. The first comparison signal COM1 may be activated when the second integral signal S4 is smaller than the first comparison voltage $V_{RN}$, and the second comparison signal COM2 may be activated when the second integral signal S4 is larger than the second comparison voltage $V_{RP}$.

The operation circuit 605 activates the noise detection signal $S_{ND}$ according to the logic states of the first and second comparison signals COM1 and COM2. The first and second comparison signal COM1 and COM2 are activated when the driving signal $S_D$ contains peaking noise. The noise detection signal $S_{ND}$ is therefore activated when any one of the first and second comparison signals COM1 and COM2 is activated. Thus, the operation circuit 605 may be set in consideration of such logic. For example, when the first and second comparison signals COM1 and COM2 are activated in a logic high state, the operation circuit 605 to activate the noise detection signal $S_{ND}$ may be implemented with two input OR gates. On the other hand, when the first and second comparison signals COM1 and COM2 are activated in a logic low state, the operation circuit 605 to activate the noise detection signal $S_{ND}$ may be implemented with two input AND gates. Since how to use the logic state of the noise detection signal $S_{ND}$ corresponding to an output of the operation circuit 605 is easily understood by those skilled in the art, the detailed descriptions thereof are omitted herein.

Figure 7:
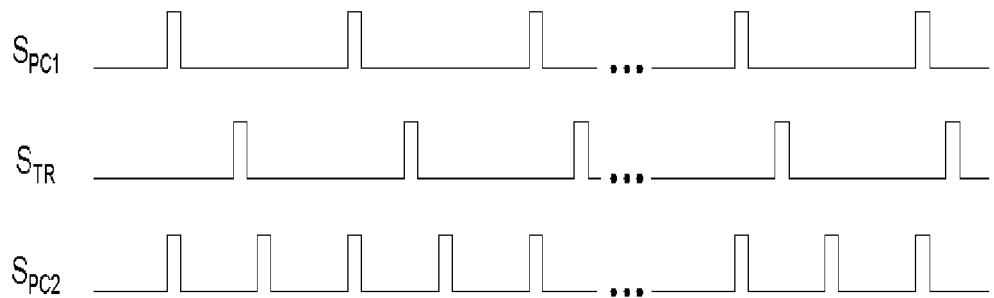
FIG. 7 is a waveform diagram of signals used in the signal processing circuit according to the embodiment of the present invention.

FIG. 7 is a waveform diagram of signals used in the signal processing circuit according to the embodiment of the present invention.

Referring to FIG. 7, the second precharge signal $S_{PC2}$ of the second integral circuit 131 or 231 may have a frequency two times larger than the frequency of the first precharge signal $S_{PC1}$ of the first integral circuit 120 or 220.

Figure 8:
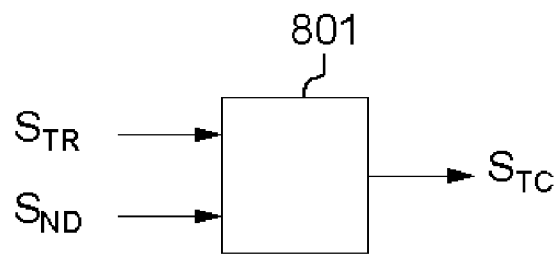
FIG. 8 illustrates an integral control signal generation circuit to generate an integral control signal.

The reason that a frequency difference is set between the first and second precharge signals $S_{PC1}$ and $S_{PC2}$ is that the first integral circuit 120 or 220 samples and integrates one of a falling differential output signal and a rising differential output signal, but the second integral circuit 131 or 231 integrates both of the falling differential output signal and the rising differential output signal and generates the second integral signal S4. The charge transfer signal $S_{TR}$ and the first precharge signal $S_{PC1}$ may be set in a non-overlap two phase state. FIG. 8 illustrates the integral control signal generation circuit.

Referring to FIG. 8, the integral control signal generation circuit 801 may be designed in consideration of the characteristics of the integral control signal $S_{TC}$ described with reference to FIG. 5. The integral control signal generation circuit 801 generates the integral control signal $S_{TC}$ for controlling the integral operation of the first integral circuit 120 or 220 to not be performed, when an input signal contains peaking noise.

For example, when the noise detection signal $S_{ND}$ is deactivated because the input signal does not contain peaking noise, the integral control signal $S_{TC}$ is generated so that the first integral circuit 120 or 220 performs integration depending on whether the charge transfer signal $S_{TR}$ is activated or not. When the noise detection signal $S_{ND}$ is activated because the input signal contains peaking noise, the integral control signal $S_{TC}$ is generated at a level for controlling the first integral circuit 120 or 220 to not perform integration regardless of whether or not the charge transfer signal $S_{TR}$ is activated. In this embodiment of the present invention, the integral control signal $S_{TC}$ is generated through an AND operation of the noise detection signal $S_{ND}$ and the charge transfer signal $S_{TR}$, but the present invention is not limited thereto. The integral control signal generation circuit 801 may be included in the noise sensing circuit 130 or 230.

Figure 9:
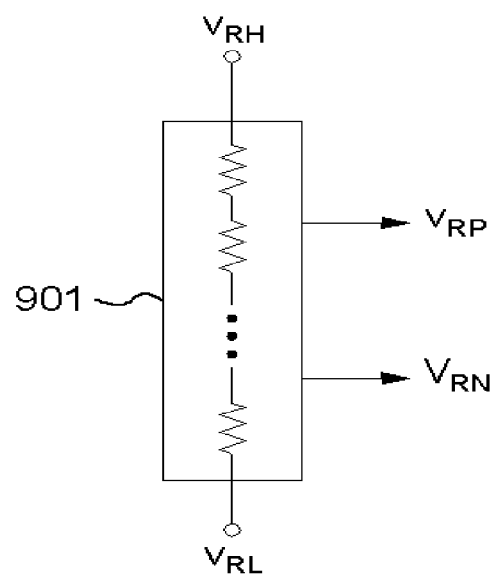
FIG. 9 illustrates a comparison voltage generation device.

FIG. 9 illustrates a comparison voltage generation device.

Referring to FIG. 9, the comparison voltage generation device 901 may include a plurality of resistors connected in series between a high voltage $V_{RH}$ and a low voltage $V_{RL}$ having different levels. The first and second comparison voltages $V_{RN}$ and $V_{RP}$ may be selected among the node voltages of the resistors connected in series. An intermediate voltage between the high voltage $V_{RH}$ and the low voltage $V_{RL}$ may serve as the reference voltage $V_{ref}$ used in the second integral circuit 131 or 231. The comparison voltage generation device 901 may be included in the comparison unit 602 of the noise detection circuit 132 or 232.

Figure 10:
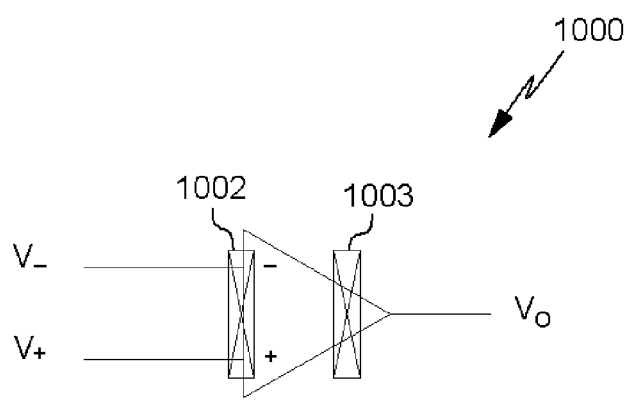
FIG. 10 illustrates an operation amplifier including chopping connection.

FIG. 10 illustrates an operation amplifier including chopping connection.

The chopping operational amplifier 1000 illustrated in FIG. is configured in a different manner from the operational amplifiers 301, 401, 501, and 601 illustrated in FIGS. 3, 4, 5, and 6. The chopping operational amplifier 1000 includes an input stage 1002 connected to an input terminal of the operation amplifier and an internal stage 1003 positioned inside the operational amplifier circuit. The input stage 1002 and the internal stage 1003 may be implemented with chopping circuits of which signal transmission paths cross each other to remove a DC offset or the like.

Figure 11:
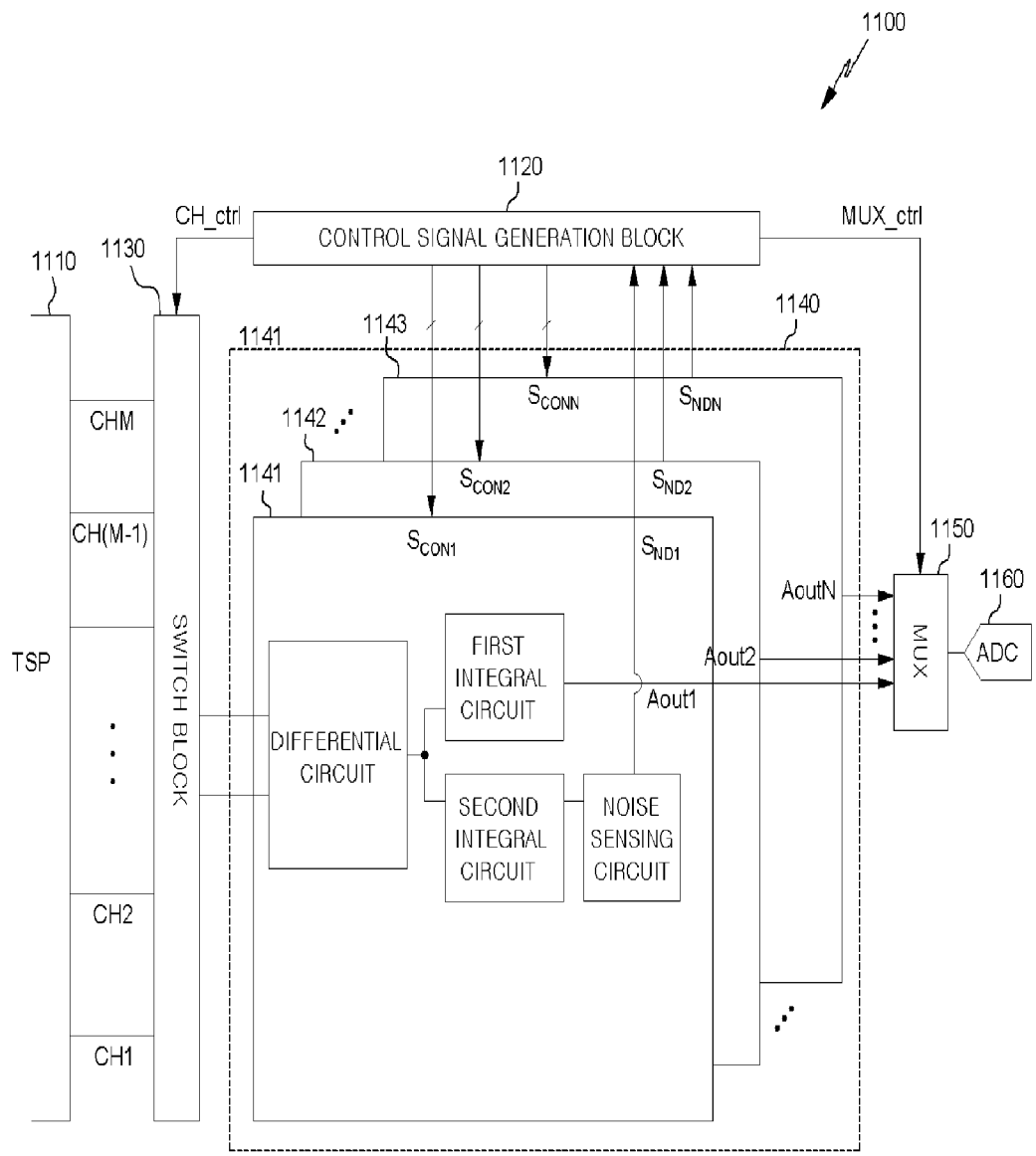
FIG. 11 illustrates a signal processing system of a touch screen according to another embodiment of the present invention.

FIG. 11 illustrates a signal processing system of a touch screen according to another embodiment of the present invention.

Referring to FIG. 11, the signal processing system 1100 includes a touch screen 1110, a control signal generation block 1120, a first switch block 1130, a signal processing block 1140, a second switch block 1150, and an analog digital converter 1160.

The first switch block 1130 is configured to switch a plurality of channel terminals CH1, CH2, CH(M−1), and CHM formed in the touch screen 1110 to corresponding signal processing circuits 1141 to 1143 in response to a channel select signal CH_ctrl.

The signal processing block 1140 includes a plurality of signal processing circuits configured to process an input signal (not illustrated), which is outputted from the touch screen 1110 and inputted through the first switch block 1130, and generate noise detection signals $S_{ND1}$ to $S_{NDN}$ and integral signals $A_{out1}$ to $A_{outN}$ in response to a plurality of control signals $S_{CON1}$ to $S_{CONN}$, respectively.

The respective signal processing circuits 1141 to 1143 of the signal processing block 1140 may be configured to operate in the single mode as illustrated in FIGS. 1 and 2 or in the differential mode as illustrated in FIGS. 3 and 4.

The second switch block 1150 is configured to switch the plurality of integral signals $A_{out1}$ to $A_{outN}$ to the analog digital converter 1160 in response to a MUX(Multiplexer) control signal MUX_ctrl. The analog digital converter 1160 converts the integral signals $A_{out1}$ to $A_{outN}$ into digital signals.

The control signal generation block 1120 is configured to generate the plurality of control signals $S_{CON1}$ to $S_{CONN}$ using the plurality of noise detection signals $S_{ND1}$ to $S_{NDN}$ and generate the channel select signal CH_ctrl and the MUX control signal MUX_ctrl. The plurality of control signals $S_{CON1}$ to $S_{CONN}$ include the differential mode signal M, the signal mode signal MB, the first precharge signal $S_{PC1}$, the second precharge signal $S_{PC2}$, the first reset signal $S_{RST1}$, the second reset signal $S_{RST2}$, the charge transfer signal $S_{TR}$, and the integral control signal $S_{TC}$.

Figure 12:
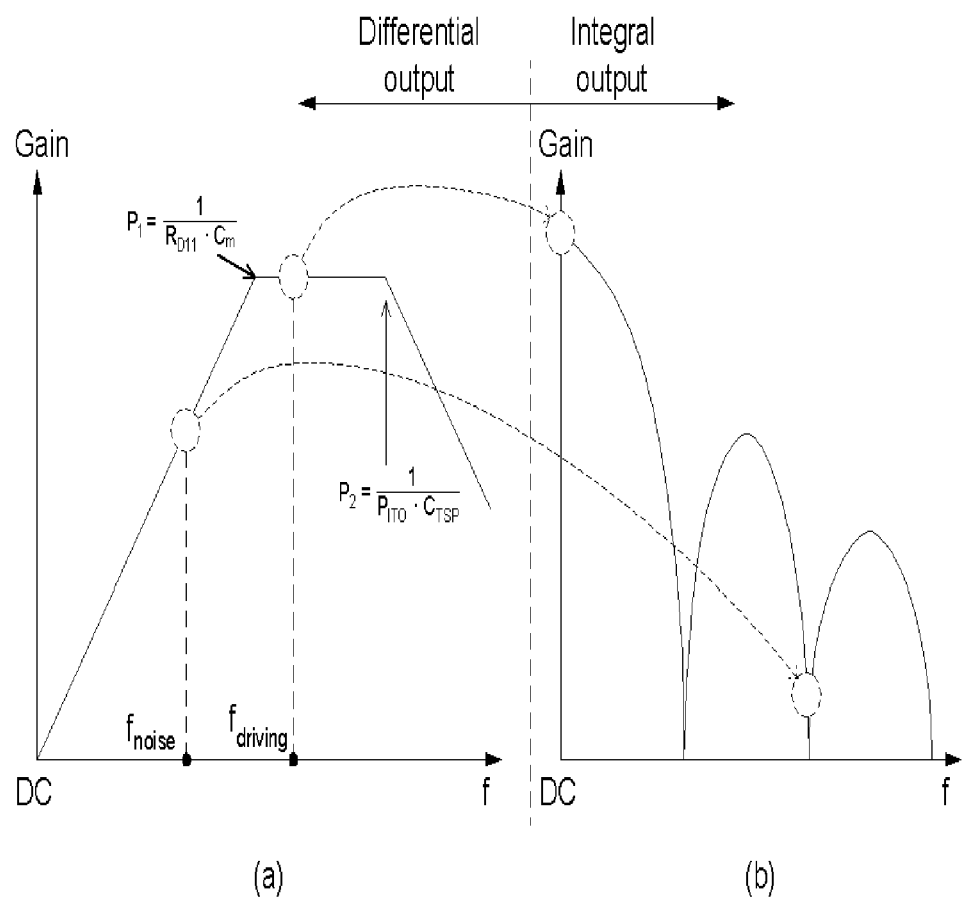
FIG. 12 illustrates frequency characteristics of the signal processing circuit according to the embodiment of the present invention

FIG. 12 illustrates frequency characteristics of the signal processing circuit according to the embodiment of the present invention.

FIG. 12 (a) illustrates HPF characteristics of the differential circuit according to the embodiment of the present invention, and FIG. 12 (b) illustrates LPF characteristics of the integral circuit. In FIGS. 12 (a) and (b), $f_{driving}$ represents the frequency of the driving signal $S_D$, and $f_{noise}$ represents a noise frequency lower than the frequency of the driving signal $S_D$.

A transfer function $H_{sing}(s)$ in the single mode is expressed as Equation 1 below, and a transfer function $H_{diff}(s)$ in the differential mode is expressed as Equation 2 below.

$$H_{sing}(s) = \frac{s \cdot R1 \cdot C_{m1}}{(1 + s \cdot R2 \cdot C_{m1}) \cdot (1 + s \cdot R_{TSP} \cdot C_{para})} \quad \text{[Equation 1]}$$

$$H_{diff}(s) = \frac{s \cdot R1 \cdot (C_{m1} - C_{m2})}{(1 + s \cdot R2 \cdot C_{m1}) \cdot (1 + s \cdot R_{TSP} \cdot C_{para})} \quad \text{[Equation 2]}$$

Here, s represents a complex frequency, R1 and R2 represent the resistors R1 and R2 illustrated in FIGS. 2 and 4, $C_{m1}$ represents the coupling capacitor $C_{m1}$ illustrated in FIG. 1, $C_{m2}$ represents the coupling capacitor $C_{m2}$ illustrated in FIG. 3, $R_{TSP}$ represents sheet resistance of a touch screen panel, and $C_{para}$ represents parasitic capacitance of the touch screen panel.

Referring to FIG. 12 (a), the filter frequency characteristic of the differential circuit is set by the transfer function. Referring to Equations 1 and 2, a first pole P1 and a second pole P2 may be expressed as Equation 3.

$$P1 = \frac{1}{R2 \cdot C_{m1}}; P2 = \frac{1}{R_{TSP} \cdot C_{para}} \quad \text{[Equation 3]}$$

Referring to Equation 3, it can be seen that the first pole P1 is set by the coupling capacitor and the resistor R2 and the second pole P2 is set by the sheet resistance and the parasitic capacitance of the touch screen.

Referring to FIG. 12 (b), a low pass filter (LPF) of the integral circuit shifts frequencies of a differential signal into a low band, and generates a null frequency. In this embodiment of the present invention, the frequency $f_{driving}$ of the driving signal $S_D$ is shifted to a DC frequency, and the noise frequency $f_{noise}$ is shifted to a second null frequency.

Thus, the input signal is outputted as a value multiplied by a maximum gain set in the LPF after passing the LPF of the integrator, but the noise signal is outputted as a value multiplied by a low gain set in the LPF. Supposing that the gain of the LPF is 1 (one), the gains of sections other than the pass band may be set to at least 1/1000 (=−60 dB). Therefore, signals having frequencies other than the low band have a magnitude corresponding to an almost ignorable level after passing through the LPF, and thus may be removed.

Figure 13:
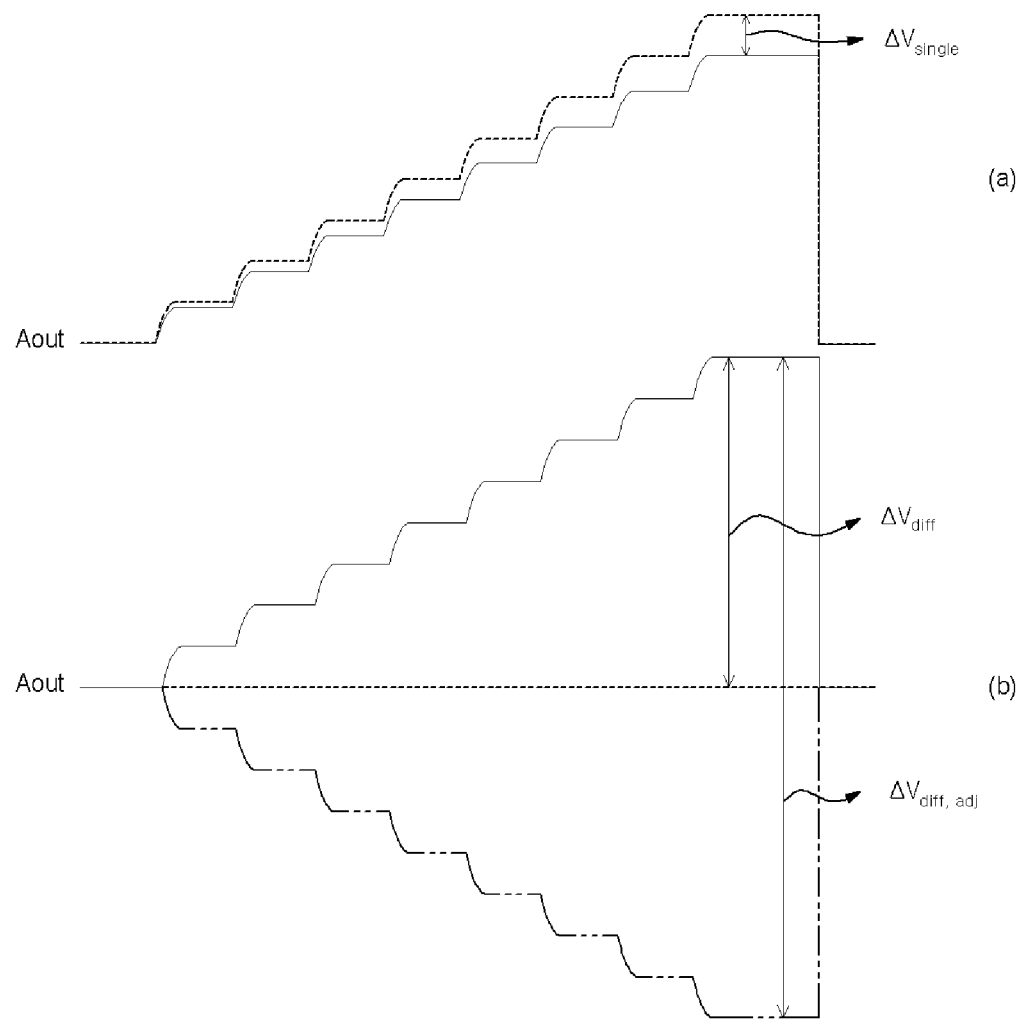
FIG. 13 illustrates integral signals outputted in a single mode and a differential mode.

FIG. 13 illustrates integral signals outputted in the single mode and the differential mode.

Referring to FIG. 13, an integral signal Aout outputted from the signal processing circuit 100 or 200 according to the embodiment of the present invention has a predetermined voltage difference between when a user touches the touch screen (dotted line) and when a user does not touches the touch screen (solid line). In FIG. 13B, a two-dot chain line represents an integral signal when an adjacent channel is touched.

Referring to FIG. 13A, a voltage difference $\Delta V_{single}$ of the integral signal indicates a voltage difference between when the touch screen is touched and when the touch screen is not touched. The maximum difference $\Delta V_{max,single}$ of the integral signal between when the touch screen is touched and when the touch screen is not touched in the single mode may be expressed as Equation 4 below.

$$\Delta V_{max,single} = \frac{VDD}{2} \cdot \Delta V_{single} \quad \text{[Equation 4]}$$

Here, VDD represents a voltage level of an operating voltage.

Referring to FIG. 13B, a voltage difference $\Delta V_{diff}$ of the integral signal indicates a difference between when the touch screen is touched and when the touch screen is not touched. The maximum difference $\Delta V_{max, diff}$ of the integral signal between when the touch screen is touched and when the touch screen is not touched in the differential mode may be expressed as Equation 5.

$$\Delta V_{max,diff} = \frac{VDD}{2} \quad \text{[Equation 5]}$$

The maximum difference $\Delta_{max,\,diff,\,adj}$ between voltages of integral signals of adjacent channels in the differential mode may be expressed as Equation 6.

$$\Delta V_{max,diff,adj} = VDD \quad \text{[Equation 6]}$$

Referring to Equations 4, 5, and 6, it can be seen that the difference in the differential mode between when a user touches the touch screen and when a user does not touch the touch screen is larger than the difference in the single mode, and thus a signal to noise ratio (SNR) of the differential mode is higher than that of the single mode.

Figure 14:
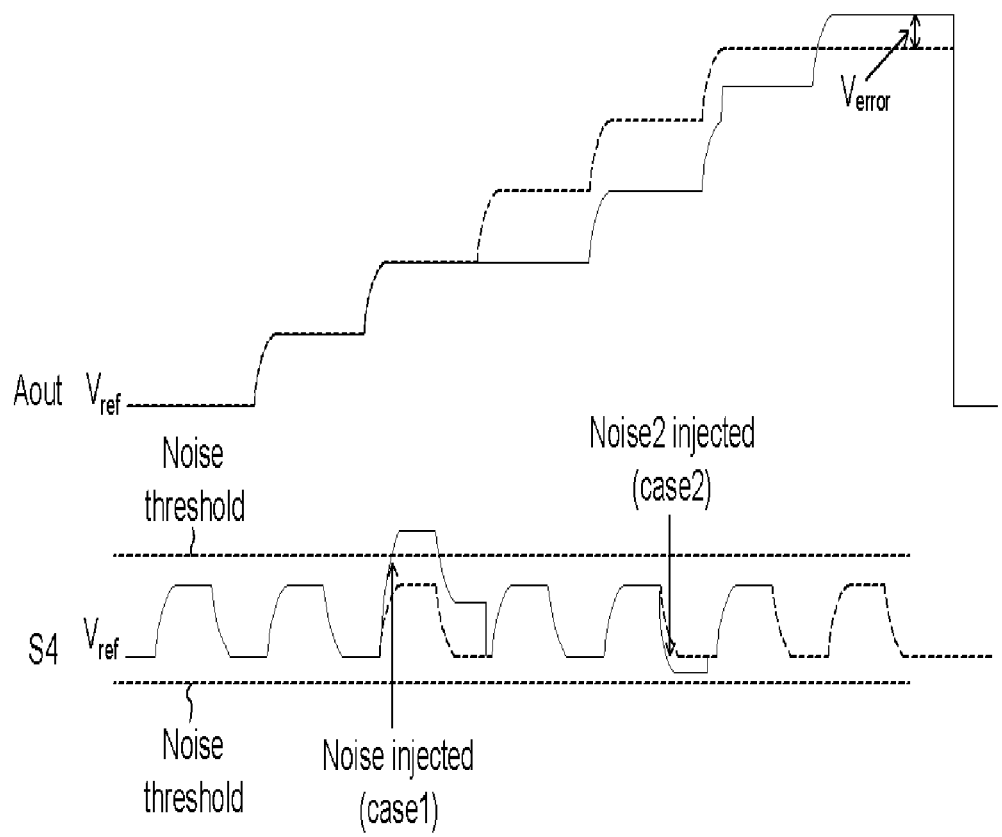
FIG. 14 is a diagram for explaining the operation of the noise detection circuit according to the embodiment of the present invention.

FIG. 14 is a diagram for explaining the operation of the noise sensing circuit according to the embodiment of the present invention.

Referring to FIG. 14, when there is no peaking noise, the integral signal S4 of the second integral circuit 131 or 231 forming the noise sensing circuit 130 or 230 has a periodic form in which the integral signal S4 rises to a predetermined voltage at a predetermined period and drops to the reference voltage $V_{ref}$ as indicated as a dotted line. In this case, the integral signal Aout outputted from the first integral circuit 120 or 220 has a voltage as indicated by a dotted line.

When peaking noise occurred at two spots (case 1 and case 2), the integral signal S4 of the second integral circuit 131 or 231 has a higher or lower voltage level than the reference voltage $V_{ref}$, compared to when there is no peaking noise, depending on the form of the peaking noise as indicated by a solid line. In this case, the integral signal Aout outputted from the first integral circuit 120 or 220 has a voltage level as indicated by a solid line, because the differential signal is not integrated at the sections where peaking noise occurred.

In particular, when the magnitude of the peaking noise is larger than a noise threshold (case 1), the first integral circuit 120 or 220 does not perform integration, but when the magnitude of the peaking noise falls within the range of the noise threshold (case 2), the first integral circuit 120 or 220 may perform integration. In order to prevent an error $V_{error}$ which occurs at the voltage level of an integral signal when a distorted signal is integrated, the range of the noise threshold may be adaptively adjusted according to the system.

According to the embodiments of the present invention, since the input signal provided from the touch screen is bandpass-filtered, continuous noise contained in the input signal may be removed.

Furthermore, when peaking noise is detected from the input signal provided from the touch screen, transmission of the input signal is controlled. Thus, a filtering function for the peaking noise may be performed.

Furthermore, since continuous noise is filtered from the input signal provided from the touch screen and peaking noise is detected from a separate path to control transmission of the input signal to the next stage, the continuous noise and peaking noise may be filtered.

Furthermore, since continuous noise and peaking noise may be filtered, the SNR may be improved.

Although a preferred embodiment of the present invention has been described for illustrative purposes, those skilled in the art will appreciate that various modifications, additions and substitutions are possible, without departing from the scope and the spirit of the invention as disclosed in the accompanying claims.

What is claimed is:

1. A signal processing system of a touch screen, comprising:
   a first switch block configured to switch a plurality of channels set in the touch screen in response to a channel select signal;
   a touch signal processing block comprising a plurality of touch signal processing circuits configured to generate a plurality of noise detection signals by processing input signals for the respective channels, and generating a plurality of integral signals by processing the input signals for the respective channels, wherein each of the touch signal processing circuits generates an integral signal by integrating a differential signal of an input signal to remove continuous noise from the input signal when the input signal contains the continuous noise. and stops integration of the differential signal when the input signal contains peaking noise;
   a second switch block configured to switch transmission of the plurality of integral signals to an analog digital converter in response to a multiplexer control signal; and
   a control signal generation block configured to generate the plurality of control signals using the plurality of noise detection signals and generate the channel select signal and the multiplexer control signal.

2. The signal processing system of claim 1, wherein each of the touch signal processing circuits comprises:
   a differential circuit configured to differentiate the input signal for each of the channels and generate the differential signal;
   a first integral circuit configured to generate a first integral signal by integrating the differential signal according to the control signal; and
   a noise sensing circuit configured to receive the differential signal, determine whether or not the input signal contains peaking noise, and generate and provide the noise detection signal which is activated depending on whether or not the input signal contains peaking noise.

3. The signal processing system of claim 1, wherein each of the touch signal processing circuits comprises:
   a first circuit configured to provide a noise detection path for receiving the input signal for each of the channels and generating the noise detection signal indicating whether or not the input signal contains peaking noise; and
   a second circuit configured to provide a main signal path for receiving the input signal and generating an integral signal by band-pass-filtering continuous noise contained in the input signal, and control transmission of the integral signal through the main signal path according to the control signal.

4. The signal processing system of claim 3, wherein the first and second circuits share a differential circuit to generate a differential signal by differentiating the input signal, and the first circuit checks the level of a signal obtained by integrating the differential signal, thereby determining whether or not the peaking noise is contained.

5. The signal processing system of claim 3, wherein the first and second circuits share a differential circuit to generate a differential signal by differentiating the input signal, and the second circuit performs the band pass filtering through the generation of the differential signal and the generation of the integral signal.

6. A touch signal processing circuit comprising:
   a first circuit configured to provide a noise detection path for receiving an input signal transmitted from a touch screen and generating a noise detection signal indicating whether or not the input signal contains peaking noise; and
   a second circuit configured to provide a main signal path for receiving the input signal, generating a differential signal by differentiating the input signal, generating an integral signal by integrating the differential signal to perform band-pass-filtering of continuous noise when the input signal contains the continuous noise, and stopping integration of the differential signal in response to the noise detection signal when the input signal contains the peaking noise.

7. The touch signal processing circuit of 6, wherein the first and second circuits share a differential circuit configured to generate a differential signal by differentiating the input signal.

8. The touch signal processing circuit of 7, wherein the first circuit determines whether or not the peaking noise is contained, depending on the level of the integral signal obtained by integrating the differential signal.

9. The touch signal processing circuit of 7, wherein the second circuit performs the band-pass-filtering through the generation of the differential signal and the generation of the integral signal.

10. A signal processing circuit of a touch screen, comprising:
a differential circuit configured to generate a differential signal by differentiating an input signal provided from a coupling capacitor of the touch screen in response to a driving signal;
a first integral circuit configured to generate a first integral signal by integrating the differential signal according to an integral control signal to remove continuous noise from the input signal when the input signal contains the continuous noise. and to stop integration of the differential signal according to the internal control signal when the input signal contains peaking noise; and
a noise sensing circuit configured to receive the differential signal and to generate the integral control signal which is activated when the input signal contains the peaking noise.

11. The signal processing circuit of claim 10, wherein the differential circuit operates in any one of a single mode for differentiating an input signal of one channel of the touch screen and a differential mode for differentiating a difference between input signals of two channels of the touch screen.

12. The signal processing circuit of claim 10, wherein the differential circuit differentiates the input signal and generates the differential signal including a falling differential output signal and a rising differential output signal which are generated in response to rising and falling timings of the driving signal.

13. The signal processing circuit of claim 10, wherein the first integral circuit integrates the differential signal to remove continuous noise contained in the input signal or blocks peaking noise contained in the input signal from being transmitted to the next stage by stopping integrating the differential signal, depending on the state of the integral control signal.

14. The signal processing circuit of claim 10, wherein the first integral circuit generates the first integral signal by integrating any one of a falling differential output signal and a rising differential output signal which are included in the differential signal.

15. The signal processing circuit of claim 10, wherein the differential circuit and the first integral circuit have a filtering function for bands separated from each other, thereby performing band-pass filtering.

16. The signal processing circuit of claim 10, wherein the noise sensing circuit comprises:
a second integral circuit configured to generate a second integral signal by integrating the differential signal; and
a noise detection circuit configured to detect the peaking noise contained in the second integral signal and generate a noise detection signal for generating the integral control signal.

17. The signal processing circuit of claim 16, wherein the second integral circuit generates the second integral signal by integrating both of a falling differential output signal and a rising differential output signal which are included in the differential signal.

18. The signal processing circuit of claim 16, wherein the noise detection circuit comprises:
a comparison unit configured to compare two or more comparison voltages having different levels to the second integral signal and generate two or more comparison signals; and
an operation circuit configured to generate the noise detection signal using the two or more comparison signals.

19. The signal processing circuit of claim 18, wherein the noise detection signal is activated when at least one of the two or more comparison signals is activated.

20. The signal processing circuit of claim 16, wherein the noise sensing circuit further comprises an integral control signal generation circuit configured to generate the integral control signal according to the noise detection signal.

* * * * *